United States Patent [19]

Varga et al.

[11] 4,116,424

[45] Sep. 26, 1978

[54] ENGINE REPAIR STAND

[75] Inventors: Theodore Varga, Atlantic City; Arthur Devine, Jr.; Warren Meikle, both of Ventnor, all of N.J.

[73] Assignee: Meikle & Devine, Inc., Hammonton, N.J.

[21] Appl. No.: 847,133

[22] Filed: Oct. 31, 1977

[51] Int. Cl.[2] ........................................ B23Q 1/04

[52] U.S. Cl. ........................................ 269/55; 269/296

[58] Field of Search ........................ 269/17, 55, 296, 81

[56] References Cited

U.S. PATENT DOCUMENTS

| | | | |
|---|---|---|---|
| 2,301,019 | 11/1942 | Couse | 269/17 |
| 2,931,644 | 4/1960 | Kenworthy | 269/17 |
| 3,458,057 | 7/1969 | Stefan et al. | 269/55 |

*Primary Examiner*—Robert C. Watson
*Attorney, Agent, or Firm*—Thomas A. Lennox

[57] ABSTRACT

An engine repair stand of two holding frames, one for each side of the engine is provided such that the engine can be held a short distance above the ground in an upright or inverted position and moved by hand back and forth to readily reach all parts of the engine. The engine is held at its normal motor mount positions with the center of gravity of the engine off-set from the attachment position such that when the ends of the stand are rounded the engine may be turned over with ease by hand. Universal mounting members are provided so that the frame means generally constructed of tubular steel may be used with any type of engine.

12 Claims, 9 Drawing Figures

ENGINE REPAIR STAND

BACKGROUND OF THE INVENTION

Internal combustion engines require repair and for major repairs it is necessary to remove the engine from the vehicle or device in which it is used. It is generally required to remove the engine when it is overhauled and for some modern automobiles, where space has become a premium under the hood, it is necessary to remove the engine for many repairs.

There are a number of devices that have been designed over the years to hold the engine after it has been removed from the vehicle. These include U.S. Pat. Nos. 1,065,979 to C. W. Spencer, 1,219,460 to C. H. Impson, 1,236,246 to A. F. Amelung, 1,792,612 to J. H. Staley, and 2,311,668 to M. DeKennedy. All of these patents disclose engine stands of various designs to hold the engine while it is being worked on.

Some engine stands are even motorized to elimitate the necessity of turning the engine by hand such as U.S. Pat. No. 1,424,190 to J. W. Cole and A. E. Johnson.

More recently, and typical of the engine stands presently in use, are those described in U.S. Pat. No. 2,654,147 to F. P. Wilson et al. Unfortunately, this stand is bulky, heavy and most expensive. In addition, even though it is counterbalanced, the position of the engine and the height of the engine above the floor creates a most unstable device when the engine is in place. In addition, there is substantial strain on the parts of the engine where it is attached to the motor span as it is held in a most abnormal position for the mounts as designed.

Apparatus for tilting entire automobiles have been described as in U.S. Pat. No. 1,478,256 to J. O. Reid, and more recently in 3,674,252 to R. Crabtree, et al.

None of these devices satisfy the need of the engine repair field and none describe the invention hereinafter disclosed.

It is an object of this invention to provide an engine repair stand which will allow the engine to be held off the floor or the table on which it rests and further to allow the engine to be turned up-side-down by hand to fully expose the bottom of the engine to facilitate repair.

It is a further object of this invention to provide an engine stand which can be readily attached to the engine and removed with no special tools or special handling devices.

It is a further object of this invention to provide an engine stand that may be easily stored when removed from the engine and does not use floor space when in use.

It is a further object of this invention to provide an engine stand for repair of engines which places the center of gravity of the engine and the stand close to the floor or the worktable on which the device rests so as to limit any danger of substantial damage to the engine or to the mechanic should the engine fall to the floor or to the table on which it rests.

It is a further object of this invention to utilize the weight of the engine to provide torque to allow the engine to be easily rotated without creating any significant safety hazard to the mechanic.

It is a further object of this invention to provide an engine repair stand to provide access not only to the top and bottom of the engine but also to the side of the engine.

It is a further object of this invention to provide an engine stand which can actually be run while on the stand without creating any hazard or removing the engine from the stand.

These and other objects as will be apparent from the following disclosures are made available for the first time by the invention described herein.

SUMMARY OF THE INVENTION

This invention relates to an engine repair stand including two holding frames, one demountably attached, generally through bolts, to the right engine mount position and one demountably attached again through bolts, to the left engine mounting position on the engine. These mounting positions on the engine are those points where the engine is normally attached to the device on which it operates, such as the normal mounting positions on an automobile engine.

Each holding frame, one righthand and one lefthand, includes a horizontal base haing at least two support points in linear relationship such that when the base is placed on a flat surface, such as the floor, that the base rests solidly on those support points. The horizontal base is preferably a straight piece of tubular steel such that there are multiple support points along its length.

At the end of the horizontal base are connecting members each connecting to separate upright side struts in a generally vertical position. The base connecting members are preferably rounded sufficiently to more easily allow the engine repair stand holding the engine above the floor to be lifted and rocked to a position wherein the stand is resting on the side struts, one from each holding frame, generally being the struts to the rear of the engine. This allows the engine to temporarily rest on its side for access to either the top or the bottom of the engine. Generally, the repair stand with the engine is rolled further so that it is held up-side-down in a more stable position.

A top horizontal member is rigidly and structurally connected through top connecting members to the top ends of the side struts. As in the horizontal base, the top horizontal member has at least two support points in linear relationship such that the support points rest on the floor and prevent the engine from touching that flat surface. As with bottom connecting members, the top connecting members are preferably rounded to allow the engine repair stand to be more easily moved from being supported on the side struts to the position where the engine is supported up-side-down on the support points of the top horizontal member. Preferably, the bottom connecting means and the top connecting means are both rounded tubular steel having sufficient radius to allow the engine repair stand to be rocked into the new position but not so large a radius as to affect the stability of the stand by requiring the support points to be too close together.

While the top horizontal member may be straight tubular metal, a preferred embodiment includes two interior vertical members extending downwardly from the top horizontal member on which the support points are located to a level horizontally coincident with the level of the mounting means which is attached to the engine. The mounting means is capable of demountably attaching to the engine mount of engines of varying type and size and is structurally and rigidly attached to at least a vertical support member and in this preferred embodiment also to an intermediate horizontal element rigidly connected between the intermediate vertical members at the level horizontally that of the mounting means.

There may be more than one vertical support member but at least one is structurally and rigidly connected between the horizontal base and the top horizontal member and holds the mounting means and is capable of transmitting the force of the weight of the engine to the support points on the horizontal base when the engine is in the upright position or to the support points on the top horizontal member when the engine is in the inverted position.

The vertical support member holding the mounting means is located horizontally such that when the engine stand is holding the engine, that the center gravity of the engine is approximately in the center of the line between the support points of the horizontal base and of the line between the support points of the top horizontal member. Typically the engine mounts are not at the center of gravity of the engine and are typically toward the front of the engine from the center of gravity so that the engine being held by the mounting means provides some torque toward the rear of the engine, thus facilitating lifting the engine toward the rear to place it on its side or up-side-down.

The mounting means is structurally connected to a cantilever extension member which is structurally attached to the vertical support member. Cantilever structural member extends toward the engine from the holding frame holding the mounting means on its unsupported end. Preferably a reinforcement such as a plate fillet is connected between the cantilever member and the vertical support member and is preferably placed in a position such that the reinforcement is the tension when the engine and stand are in an upright position. Should the reinforcement structurally fail, and that is more likely in tension rather than compression, the engine would fail to rest on the oil pan which is not easily damaged rather than falling to rest on the engine head or the carburator intake, which are more easily damaged.

It is preferred that the location of the mounting means and the length of the vertical members are chosen so that the bottom most projection of the engine, usually the oil pan, is only slightly raised above the flat surface on which the engine stand rests. Likewise, the length of the vertical members are preferably chosen so that when the stand is inverted holding the engine that the top of the engine is only slightly raised above the flat surface. Obviously, since this engine stand is designed to hold a wide variety of types and sizes of engines, it is preferred that it be designed so there is only a slight clearance for the engine's extending the highest vertical distance.

It is preferred that the mounting bracket be a flat plate with a plurality of holes, the holes being oblong in various positions and extended to the shape of slots in some cases, so as to fit the largest number of types of mounts. In addition, it is preferred to provide an adapter plate which may be demountably bolted to the mounting element to provide for a larger number of holes and apertures and shapes to allow the engine stand to be used on an even larger selection of types and sizes of engines.

It is preferred that the lines between the support points on the horizontal base and the line between the support points on the top horizontal member be in parallel configuration.

DETAILED DESCRIPTION OF PREFERRED EMBODIMENTS

Figure 1:
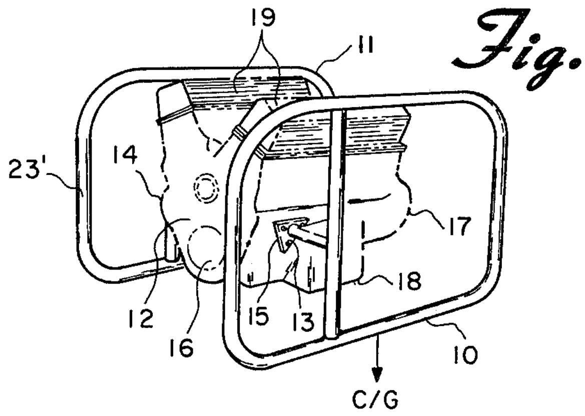
FIG. 1 is a perspective view of the engine repair stand of this invention comprising the two frames holding an engine in position for repairs.

In FIG. 1 the engine repair stand of this invention of right frame 10 and left frame 11 are shown fully supporting engine 12. Frame 10 and 11 are separate units and are connected only through the engine through mounting bracket system 13 for right frame 10 and mounting bracket 14 (hidden) for left frame 11. As is typical, the regular motor mount position 15 is toward the front 16 of engine 12 with the center of gravity C/G of engine approximately in the center of engine 12. As shown, the rear end 17 of engine 12 is further from mounting bracket 13 thus creating significant torque in a downward direction from rear end 17 on bracket 13. As illustrated there is only a short distance between the bottom 18 of engine 12 and the bottom of frames 10 and 11. In the same fashion the top heads 19 of engine 12 are only a short distance from the top of frame 10 and 11. Engine repair stand 10 and 11 is fully capable of holding and handling automobile engines such as the Chevrolet 350 cubic inch engine which weighs about 450 pounds and even the Cadillac or Oldsmobile V-8 engines which weigh approximately 860 pounds. The invention provides that by grasping frames 10 and 11 toward the front of the engine it may be easily lifted and turned completely upside down by hand.

Figure 2:
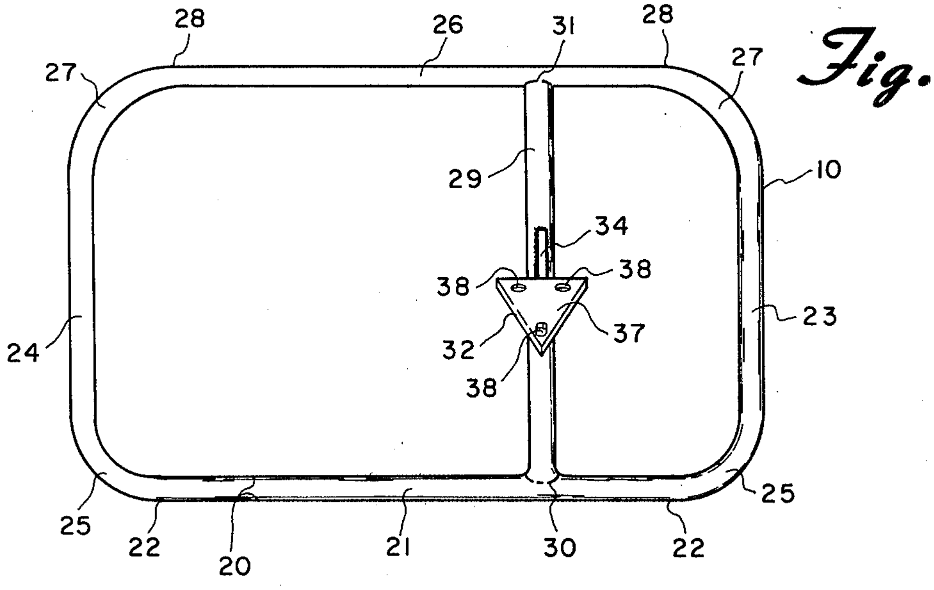
FIG. 2 is a perspective view of the right-hand frame of the engine repair stand of this invention.

Right frame 10 is pictured in FIG. 2 and is completely constructed of one inch structural steel tubing with an outside diameter of 1-IPS, approximately 1.365 inches, having a wall thickness of about one-third inch with a 35,000 psi burst strength. The outside of frame 10 is constructed entirely of a single length of the structural steel tubing, arc welded at joint 20 although it may be constructed of two or more pieces of tubing butt welded together. The frame is shaped to form horizontal base 21 which is preferably essentially straight but has at least two supporting points 22 toward the end of horizontal base 21. This is to reduce any tendancy of frame 10 to rock either forward or rear of engine 12. If horizontal base 21 is carefully formed, it may have support points 22 all along the lower edge, but these are in a linear configuration with support points toward the ends of horizontal base 21. Front upright strut 23 and rear upright strut 24 are each rigidly and structurally attached through connecting elements 25 to horizontal base 21. In this embodiment, the structural steel tubing is formed to a six inch radius for connecting elements 25 to allow ease of lifting and rocking engine 12 held by frames 10 and 11 onto the side struts to temporarily rest in that position before being turned over entirely. Typically, the person turning the engine will grip vertical strut 23 of right frame 10 and vertical strut 23 of left frame 11 and allow the torque of engine 12 extending to the rear end 17 of the engine to aid in lifting the engine in that direction.

Top horizontal member 26 is a continuation of the structural steel tubing and is connecting to side struts 23 and 24 through connecting members 27 which are curved in the structural steel tubing having a 6 inch radius. As with horizontal base 21, supporting points 28 are in linear relationship such that top horizontal member 26 rests on points as far apart as possible to provide as much stability and prevent rocking of the engine stand. While top horizontal member 26 may be a completely straight structural steel tube thus providing a plurality of supporting points 28 along its outside surface, it does not have any projections extending outwardly further than supporting points 28 at any position in between along its outside surface. Thus, horizontal base 21, base connecting element 25, rear upright strut 24, connecting element 27, top horizontal member 26, top connecting element 27, front upright strut 23 and base connecting element 25 are all formed from one piece of structural steel tubing welded at point 20.

Figure 3:
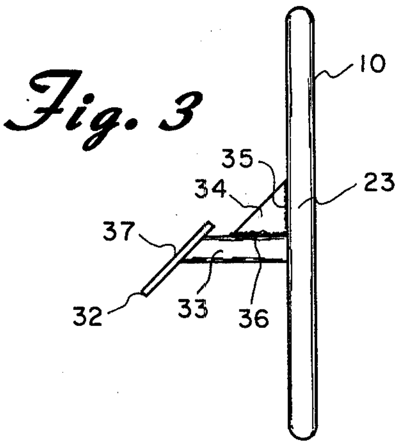
FIG. 3 is a right-hand side view of the right frame as shown in FIG. 2.
Figure 4:
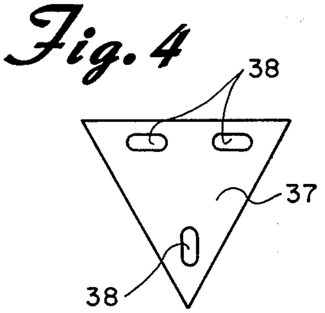
FIG. 4 is a diagram of the face of the attachment seat which is bolted to the engine mount in using the engine repair stand of this invention.

Vertical support member 29 is a piece of the 1-IPS structural steel tubing, helically welded in a saddle joint 30 to horizontal base 21 and joined at a helical weld saddle joint 31 to top horizontal member 26. Engine 12 through mount 15 is connected using standard bolts to seat 32. As shown in FIG. 3, seat 32 is structurally welded to cantilever member 33 which is welded to vertical support member 29 through a saddle joint (hidden). Reinforcement plate 34 is a triangular shaped plate of one-quarter inch hot rolled steel, retaining its temper, welded to vertical support member 29 at joint 35 and connected along weld 36 to cantilever member 33. Mounting seat 32 is attached on face 37 to motor mount 15 by standard bolts through holes 38 as illustrated in FIG. 4. The holes 38 and the shape of mounting plate 32 is designed for Chevrolet V-8 motors and holes 38 are oblong to provide for ease of installation and minor differences between motor design within the general class.

Figure 5:
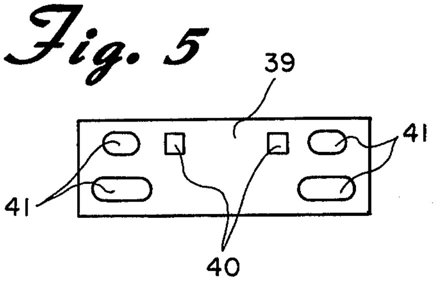
FIG. 5 is an adapter plate bolted to the seat shown in FIG. 4 to increase the numbers and types of engines that may ne used with this invention.
Figure 6:
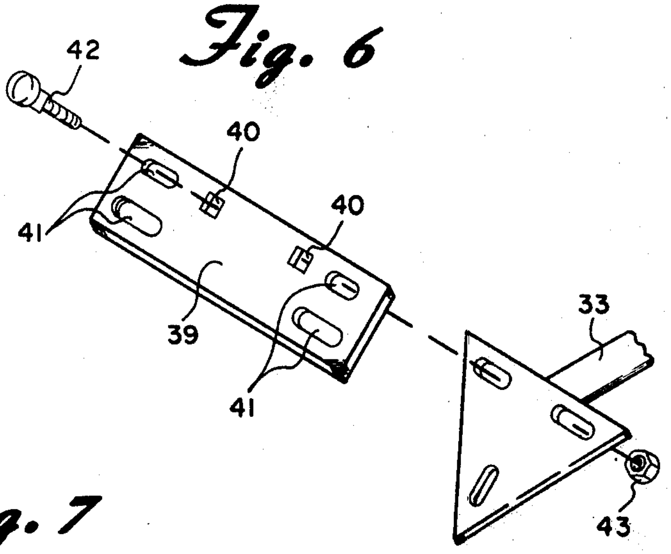
FIG. 6 is a perspective view showing the connection of the adapter plate of FIG. 5 to the seat of FIG. 4 on the repair stand of this invention.
Figure 7:
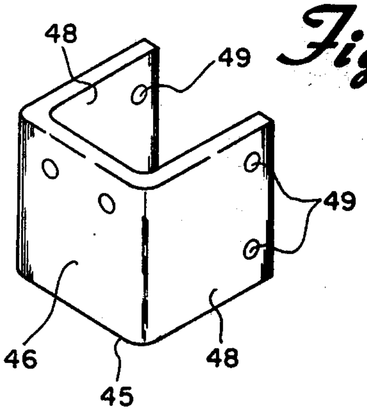
FIG. 7 is a second adapter element which is bolted to the mounting seat illustrated in FIG. 4 to attach to specific types of engines.
Figure 8:
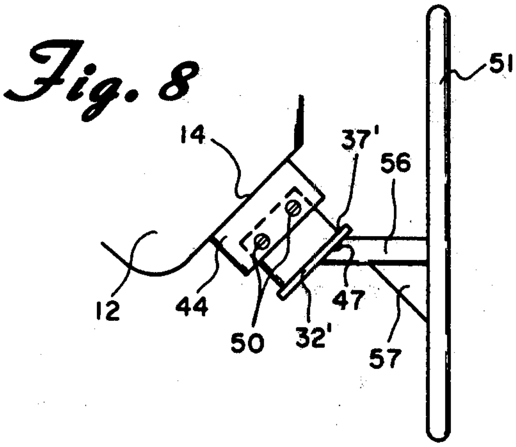
FIG. 8 is a side view showing the adapter device of FIG. 8 being used to attach the engine repair stand of this invention to the engine mount.

Adapter plate 39 is illustrated in FIG. 5 is attached to mounting seat 38 through carriage bolts through square holes 40 leaving oblong holes suitable for connection through bolts to other type of motors, including Ford motor products and other General Motors engines. Connecting of adapter plate 39 to mounting seat 32 is illustrated in FIG. 6 using carriage bolt 42 through hole 40 held securely by nut 43. A similar bolt is used to hold the plate through other hole 40 leaving holes 41 free to connect to the engine block. Certain types of engines do not allow bolting directly into the engine block but instead provide projection 44 which is illustrated in FIG. 8 showing connection of frame 50 to engine 12 at engine mount 14. Bracket 45 as illustrated in FIG. 7 is a "U" shaped bracket wherein base 46 is connected to face 37 of seat 32 by bolts 47 (one hidden). Parallel plates 48 are connected through holes 49 by bolts 50 to engine extension 44.

Figure 9:
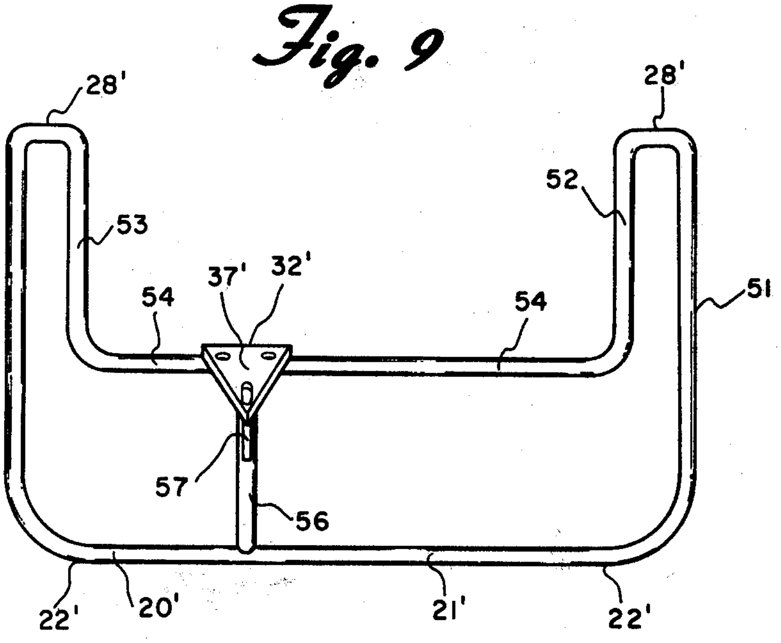
FIG. 9 is a perspective view of a left frame of the engine repair stand of this invention providing for additional access to the upper sides of the engine.

In the embodiment illustrated in FIG. 9 frame 51 is modified along the top horizontal member to provide for additional access to the upper right side of the engine. In this embodiment, top supporting points 28′ are the only points frame 51 rests on when the engine is inverted. Rear support member 52 and front support member 53 are extensions of the 1-IPS structural steel tubing and both extend downwardly to connect with horizontal member 54 which is at a height approximately the same or slightly higher than the height of mounting seat 32′ which is essentially identical to that illustrated in FIGS. 2, 4 and 6. In this case, however, mounting seat 32′ is welded to cantilever member 55 shown in FIG. 8 which is helically welded to horizontal member 54 and vertical support member 56 which in this embodiment is shorter than that of vertical support member 29 of frame 10. Cantilever tube 55 is supported by triangular reinforcement plate 57 of similar construction to that of reinforcement plate 34 welded to cantilever tube 55 and vertical support member 56, Horizontal base 21′ is essentially identical as are support points 22′ to that of frame 10. As illustrated, frame 51 is a left-hand frame for attachment on the left side of the engine facing the front of the engine.

The prior examples are merely illustrative of our invention and are not intended to limit the scope of the patent grant. Our invention is limited only by the appended claims.

We claim:

1. An engine repair stand comprising (a) two holding frames, one right hand frame, and one left hand frame, each comprising, (b) a bottom horizontal base having at least two points in a linear relationship such that when the base is placed on a relatively flat surface the base is supported on those points, (c) two upright side struts, (d) bottom connecting means providing rigid structural connection between the bottom horizontal base and each side strut, one strut being located near the front of the engine to be held and one strut being close to the rear of the engine to be held, (e) a top horizontal base having at least two points in linear relationship located along the top horizontal base such that when the repair stand is turned upside-down while holding the engine, that these points rest and support the repair stand lifting the engine off the flat surface, (f) top connecting means providing rigid structural connection at each end of the top horizontal base to the top of the two side struts, (g) at least one vertical support member which is rigidly and structurally connected between the bottom horizontal base and the top horizontal base capable of transmitting force directly to the points on the bottom horizontal base or to the points on the top horizontal base depending on the altitude of the engine stand, (h) a horizontal cantilever member structurally connected to the vertical support member extending toward the engine, (i) a mounting means structurally and rigidly attached to the cantilever member and capable of being demountably attached to the engine mount of engines of varying type and size at a location on the engine where the engine is normally mounted in the vehicle in which it is used and, (j) the size and position of the elements being such that when the right hand frame is attached to the right hand side of the engine and the left hand holding frame is attached to the left hand side of the engine, that the engine is suspended off the flat surface on which the repair stand is resting and the engine is aligned such that its sides face the respective holding frames.

2. The engine repair stand of claim 1 wherein the bottom connecting means are rounded to allow the engine stand while holding the engine, to be readily rolled over to rest on the side struts.

3. The engine repair stand of claim 2 wherein both the bottom connecting means and the top connecting means are rounded to allow the engine stand while holding the engine, to be readily rolled over to the position desired.

4. The engine repair stand of claim 1 wherein the top horizontal base has points in linear relationship located toward the ends of the top horizontal base, the middle of the top horizontal base being removed with the exposed ends structurally connected to vertical members connected in a downwardly direction, which are in turn structurally connected to an intermediate horizontal member located vertically at a level of the mounting means such that the mounting means is attached through the cantilever member to the intermediate horizontal member and the vertical support member at essentially the same point.

5. The engine repair stand of claim 1 wherein the vertical support member is located in a horizontal position such that when the mounting means hold the engine, that the center of gravity of engine is in the proximate center of the supporting points of the bottom horizontal base of the engine repair stand.

6. The engine repair stand of claim 1 wherein a reinforcement means is connected between the vertical support member and the cantilever member in position to be in tension when the engine and stand are in the upright position.

7. The engine repair stand of claim 1 wherein the vertical position of the mounting means and the length of the vertical members are chosen so that the bottom most projection of the engine, usually the pan, is only slightly raised above the flat surface on which the engine repair stand rests.

8. The engine repair stand of claim 7 wherein the length of the vertical members are chosen so that when the engine repair stand is turned over so that it is resting on the support points of the top horizontal base that the top of the engine is only slightly raised above the flat surface.

9. The engine repair stand of claim 1 wherein the mounting means is a flat plate having a plurality of elongated holes or slots therein positioned to fit a number of engine mounts of varying size and type.

10. The engine repair stand of claim 1 wherein an adaptor means is provided having a plurality of slots and holes therein chosen to allow connecting with a large number of types and sizes of engines for demountable attachment between the mounting means and the engine mount.

11. The engine repair stand of claim 1 wherein the horizontal and vertical elements are constructed of tubular metal welded at the joints and in particular welded through saddle joints when connected to the side of the tubular metal of another element.

12. The engine repair stand of claim 1 wherein the linear lines between the top base support points and the linear line between the bottom support points are in parallel configuration.

* * * * *